United States Patent [19]
Fisher

[11] Patent Number: 6,129,364
[45] Date of Patent: Oct. 10, 2000

[54] INDEPENDENT SUSPENSIONS

[76] Inventor: Kenneth G. Fisher, 40379 Road 96, Dinuba, Calif. 93618

[21] Appl. No.: 08/638,137

[22] Filed: Apr. 26, 1996

[51] Int. Cl.[7] .................................................. B60G 17/02
[52] U.S. Cl. .................................. 280/5.515; 280/DIG. 1
[58] Field of Search ............................ 280/5.506, 5.507, 280/5.515, 6.15, 124.157, 124.16, 124.161, DIG. 1; 296/65.02

[56] References Cited

U.S. PATENT DOCUMENTS

| | | | |
|---|---|---|---|
| 3,885,809 | 5/1975 | Pitcher | 280/5.506 |
| 4,822,063 | 4/1989 | Yopp et al. | 280/840 |
| 4,838,574 | 6/1989 | Baraszu | 280/707 |
| 4,913,482 | 4/1990 | Hannai et al. | 296/65.02 |
| 5,484,162 | 1/1996 | Kanoh et al. | 280/124.157 |
| 5,486,017 | 1/1996 | Goddard | 280/124.157 |
| 5,536,059 | 7/1996 | Amirouche | 296/65.02 |
| 5,627,751 | 5/1997 | Davis et al. | 280/5.506 |
| 5,630,623 | 5/1997 | Ganzel | 280/124.157 |

*Primary Examiner*—J. J. Swann
*Assistant Examiner*—Frank Vanaman
*Attorney, Agent, or Firm*—Dennis B. Haase

[57] ABSTRACT

A suspension system for a motor vehicle in which at least two wheels are independently suspended from the frame of the vehicle with at least one control arm and wherein motors are selectively actuated by sensors in the driver's seat to move the control arm on each side in response to inertial and centrifugal forces acting on the driver during operation to counteract the adverse effects of such forces.

8 Claims, 4 Drawing Sheets

INDEPENDENT SUSPENSIONS

The present invention relates generally to independent vehicle suspension systems, and more particularly to improvements in such independent systems which have as their principal purpose, the inhibition of vehicle sway during turning movement of the vehicle.

BACKGROUND OF THE INVENTION

1. Field of the Invention

The motor vehicle, particularly in the United States, has evolved from a mere mode of transportation, into a symbol of one's status in life. In recognition of this phenomenon, millions of dollars and like hours of research are expended annually to enhance the value of the driving experience.

Motor vehicles, like all bodies in motion, respond to the laws of nature, and one of the forces that constantly operate on such vehicles to denigrate the driving experience is that of centrifugal force, and its equal, but opposite reactive force, centripetal force.

It is centrifugal force that creates roll in the corners and on curves. Thus, when a body in motion, such as a motor vehicle, goes into a curve, the vehicle will tend to roll away from the center of the curve, about its center of gravity. If the center of the curve is to the driver's left, the vehicle will tend to roll to the outside of the curve, making the steering of the vehicle light on the driver's side, and the vehicle tendency will be to feel as though it wants to go straight. Depending on the speed with which the vehicle enters the curve, and to some extent the mass or weight of the vehicle, the process will give the driver and passengers, if any, a feeling or sensation, of imbalance, as though the vehicle wants to roll over on its right, or passenger side.

Aside from the unpleasant feeling of being somewhat out of control, that comes from being other than straight and level, there is a very real downside to the effects of centrifugal force on a moving motor vehicle.

Again, depending on the dynamics of the turn, and the mass and specific suspension of the vehicle involved, there may be a tendency to experience a lightening of the steering, giving the sensation of loss of control. Such sensations are not merely imagined, but are very real in that, due to the forces operating on the vehicle in a turn, there may be a narrowing of the vehicle track, and a lessening of traction, which conditions contribute in a very real diminution of driver comfort, and, because of the forces operating on the driver, to cause him to lean one way or the other, causing a danger of damage or injury to the driver, any passengers, and other vehicles in the immediate proximity.

2. Overview of Salient Prior Art

The racing fraternity, and particularly those who compete on ovals wherein the vehicle makes a right hand or left hand turn only, are acutely concerned with the inertial and gravitational forces that act on both vehicle and driver. These same forces, to a lesser extent, act on the family car and its driver and passengers. In a race vehicle, where expense is of little consequence, engineers have come up with relatively simple solutions to the adverse consequences of centrifugal force. Such solutions include using larger tires on the side of the vehicle which is always at the outside of the turn, and moving the engine off centerline to thereby alter the center of mass to minimize the effects of centrifugal force on the vehicle in the turns.

Such solutions are inapplicable in the passenger motor vehicle market for both aesthetic and mechanical reasons. Passenger vehicle manufacturers have sought for years to devise a suspension system that would respond to destabilizing forces and compensate for their adverse effects. The number of patented, and unpatented systems abound, and yet the search goes on for a simple, cost effective suspension for the family car, as well as the performance vehicles, that will minimize the adverse effects of gravitational and inertial forces.

Early in the quest for enhanced driver comfort and control, the Citroen automobile from France devised a hydraulic system that raised and lowered the vehicle, and attempted to effect a balance when the vehicle leaned to one side or the other.

The advent of the use of air bags, as a suspension component, is a more recent development, and it has achieved a degree of credibility in the industry. The patents to Ramsey, et al., U.S. Pat. No. 4,783,096, and Heider, et al., U.S. Pat. No. 4,923,210 are exemplary of the state of the art.

The patent to Hoffman, U.S. Pat. No. 5,169,129 is illustrative of the use of pneumatics to control an active suspension. The common thread that pervades the more recent art is slavish reliance on a plethora of highly complex, sensitive, and expensive array of components necessary to cause the suspension systems to perform, all of which, in addition to adding dramatically to the cost of such devices, creates a service and maintenance nightmare.

SUMMARY OF THE PRESENT INVENTION

The present invention represents a unique automated system for the ergonomic control, by the driver, of the roll characteristics of his or her vehicle, during execution of a turning movement, especially at speed.

The underlying theory of operation is relatively simple, in that it does not require highly sophisticated electronics or computers, nor does it require very complex and expensive mechanical components. Accordingly, it is adaptable to after market as well as OEM suspensions.

Moreover, and in keeping with the foregoing, it is sufficiently versatile to be fully operative with a variety of existing automobile suspension components. Perhaps the most significant feature of the present invention is that it is capable of being rendered optionally, selectively, controllable by the operator, virtually automatically, and effortlessly, so long as the operator's body is allowed to obey the fundamental laws of physics, and absent a conscious intent to challenge those laws, it is inevitable that such laws will apply.

In operation, the present invention acts to control wheel camber independently, and thereby enhances the footprint of each tire to optimize traction, and the transfer of motive energy and, thus, efficiency.

Coincidently, the improved suspension constructed in accordance with the present invention effectively controls roll of the vehicle itself to enhance driver control and comfort.

The foregoing, as well as other objects and advantages, will become apparent from a further reading of the following detailed description, when taken in conjunction with the drawings, wherein:

DETAILED DESCRIPTION OF PREFERRED EMBODIMENTS

Figure 3:
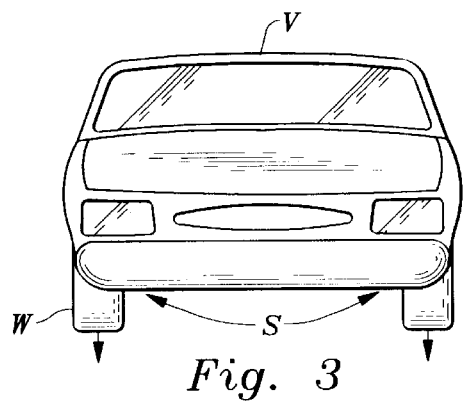
FIG. 3 depicts a vehicle, such as illustrated in FIG. 1, equipped with a novel suspension control system of the present invention, the vehicle moving in a straight line path.

With reference now to the drawings, and initially to FIG. 3, a vehicle V is illustrated for purposes of demonstrating the attributes of the present invention in both an OEM, and aftermarket configuration. It will be appreciated that while the economics of the particular circumstance has a substantial influence over whether a product or system is added to an existing vehicle, the system of the present invention is capable of being integrated into almost any basic system, whether it is strut or shock absorber driven, or involves air bags.

Clearly some of the very modern computer driven systems would probably not be readily modified, and because of their intricacy, might not benefit from such an addition. However, in the more simple configurations, great benefits can be derived with relatively little cost, and it is to such configurations that the present invention is addressed.

It is, of course, the overriding objective of the present invention to enhance both driver and passenger pleasure and safety, by smoothing out, to a substantial effect, the driving experience, by limiting the endaural and other adverse effects of the physics of propelling an object weighing two tons or more, at not insignificant speeds, along road ways that have either not been designed for significant speed, or have otherwise not withstood the ravages of time and, therefor, present both a surface and configuration which are not always user friendly.

While race cars are built to withstand the physical forces to which they will inevitably be subjected, the passenger car is, at best a compromise. While the vehicle manufacturer attempts to draw a balance between driver and passenger comfort, it is indigenous to the industry that they tout their respective products as handling well and giving the driver the feel of the road. The two concepts are, for the most part, inapposite, but millions have been spent on creating the perception.

However, by means of the present invention, the perception moves closer to the reality, and without requiring thousands of dollars in computers, or highly sophisticated systems, such as that introduced by NISSAN through their INFINITI line of luxury cars. This is accomplished, in accordance with the present invention, by first recognizing the factors that result in passenger and driver discomfort and, thereafter, addressing those factors in a simple and, above all, economical fashion.

Thus, the present invention first recognizes the reality of centrifugal forces acting on a mass moving about a central point and the equal but opposite, centripetal force. Such forces tend to cause a lifting of the mass, in this case an automobile on the side thereof which is closer to the center of rotation, with a coincident lowering, or squatting, of the side away from the center of rotation.

At the same time, the present invention takes into account the vagaries of the surfaces over which such vehicles travel, often at speeds for which the road was either not designed, or for any one of several reasons, was no longer adequate, and greatly decreases the roughness of the ride experienced by those in the vehicle traversing such surface.

In keeping with these objectives, a vehicle suspension system S modified in accordance with the present invention is detailed. With reference first to FIGS. 7 through 10, a front left corner of such a system is shown, illustrating specifics of a rather standard double wishbone suspension system 25 of the vehicle V, and is depicted in its most rudimentary form.

The suspension system 25 comprises an upper control arm 27 and a lower control arm 29. Both the upper and lower control arms are rotatably mounted, at points 32 and 34, respectively, to a vertical pillar 36 or other portion of the frame F of the vehicle V. The control arms are mounted in any well known manner so as to allow for limited vertical movement about the mounting points 32 and 34. The mounting points 32 and 34, themselves, are spaced apart by a predetermined distance, but are coplanar so as to permit the motion of the upper and lower control arms to be both aligned and controlled within parallel planes.

The upper and lower control arms engage a spindle assembly 38 at engagement points 42 and 43. Engagement points 42 and 43 are of known construction, and permit relative rotation of the control arms. The spindle assembly 38 may assume any one of several well known forms, and carries a hub and bearing assembly, to which the wheel W is attached, and a brake assembly, either drum or disc, is also included. These elements of the suspension and wheel construction vary by manufacturer, and are not required to be of a specific design in order to permit the installation and operation of the invention.

It is an important feature of the present invention to provide for the constant control and adjustment of either or both of the upper and lower control arms 27 and 29 in response to both inertial and impact forces exerted on the vehicle.

Figure 2:
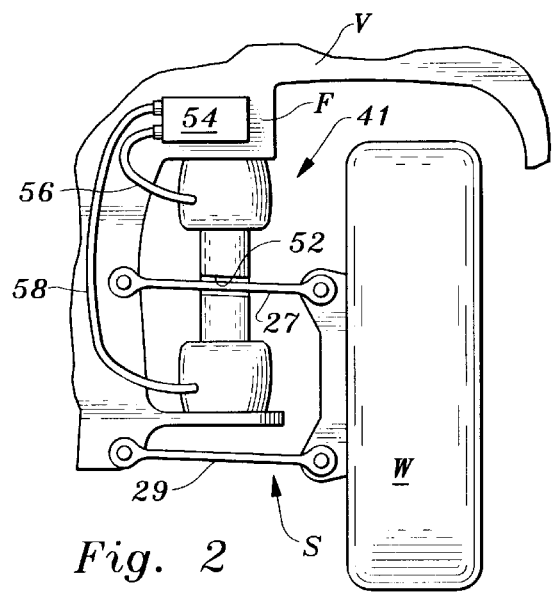
FIG. 2 is illustrative of a typical independent suspension system having upper and lower control arms attached to a kingpin assembly with spindle attached, and further illustrating a system for adjusting the position of the control arms, constructed in accordance with the present invention.
Figure 4:
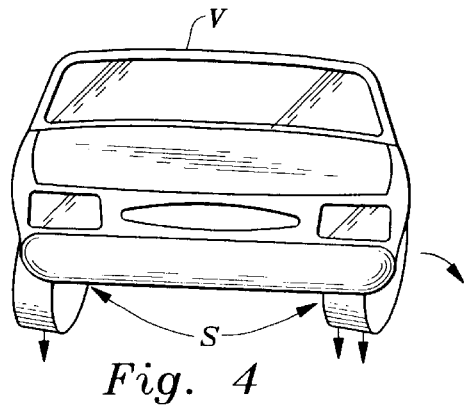
FIG. 4 is illustrative of the vehicle of FIG. 3 with a conventional suspension, in a right turn.
Figure 5:
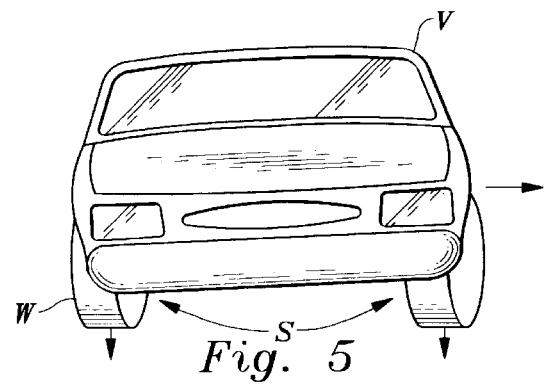
FIG. 5 is illustrative of the vehicle of FIG. 3 in a right turn with suspension constructed in accordance with the present invention.
Figure 6:
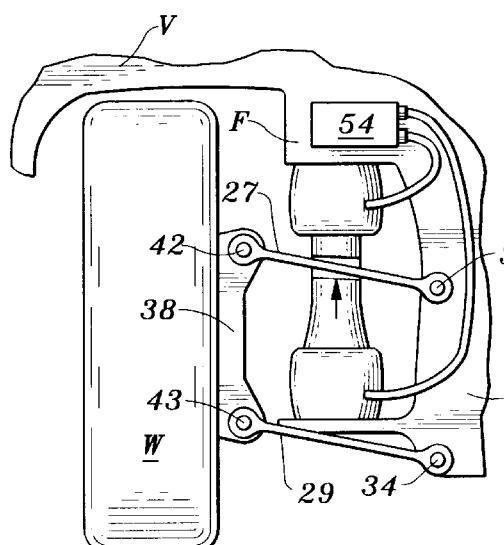
FIG. 6 is illustrative of the forward right hand corner of an active suspension system employing a novel dual air bag system constructed in accordance with the present invention, viewed from the front of the vehicle, and illustrating the interrelationship of the various elements of such a system.
Figure 7:
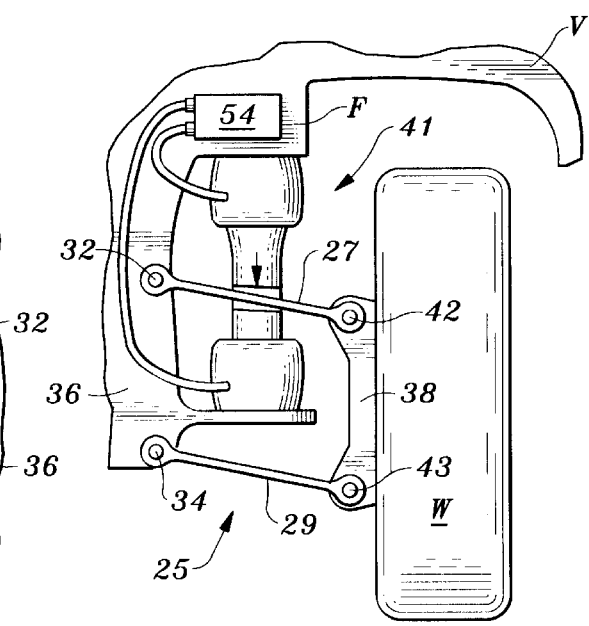
FIG. 7 is a view similar to that of FIG. 2 illustrating the response of the system with the vehicle in a right hand turn.

To this end, and referring to FIG. 2 to illustrate the structure, a suspension system, as previously described, is shown in conjunction with a novel gas motivated system 41. The gas system includes an elongated bladder 46, best seen in FIGS. 8, 9 and 10, having opposed upper and lower chambers 45 and 47, respectively, separated by an integrally formed, intermediate section 49. It will be appreciated that the use of a unitary bladder is an approach aimed at efficiency and economy, and the invention contemplates that the gas system may consist of several parts interconnected to make up the whole.

The intermediate section, in accordance with this aspect of the invention, is configured to engage, in the illustrated case, the upper control arm 27. This can be accomplished without departure from the invention, by, for example, defining an opening through the intermediate section 49. The upper control arm is then passed through the opening, such as opening 52, shown on FIG. 2. In this fashion, compressive or expansive movement within one or both of the chambers 45 and 47 will impart forces to the control arm 27. To the extent that those forces are generated in response to some force on the vehicle, and that is the primary objective of the invention, the control arm 27, and coincidently the vehicle frame relative to wheel W, is positioned, in accordance with the invention, in response to such forces.

In order, in keeping with the invention, to continuously supply a gaseous medium to the gas motivated system 41, a gas control system 54, is provided. The system, which may be of any one of several well know systems, may include a plenum, pressure sensing devices and switching devices, together with a pump or other pressure generating means, connected, respectively, to the upper and lower chambers 45 and 47 by means of gas lines 56 and 58, respectively.

It is a feature of the invention that it is responsive to inertial forces and impact forces imparted to the vehicle suspension. With respect to impact forces, for example, such forces are experienced typically in a vertical plane and are the result of the wheel W encountering pot holes, cracks, and ridges which have formed in the roadway being traversed. Additionally, foreign bodies of every description are often encountered, where they have fallen, or been thrown, from a forbearer. Such hazards tend to jar the wheel encountering them, causing a sudden drop, as in the case of a pot hole, for example, or an equally sudden lifting of the wheel, in the case of a bottle, animal, or other debris resting on the roadway.

The present invention is equally responsive to all such encounters and capable of reacting to minimize the sensation experienced in the cockpit of the vehicle by smoothing out the shock caused by the encounter. Further, the novel suspension of the present invention accomplishes its objectives independently on each side of the vehicle so that if a pothole is experienced on one corner, but not the other, adjustment is made only in response to the specific hazard. Thus, driver and passenger alike feel no jolt, discomfort, or sensation of loss of complete control, as the suspension system compensates for road hazards.

Figures 8, 9, 10:
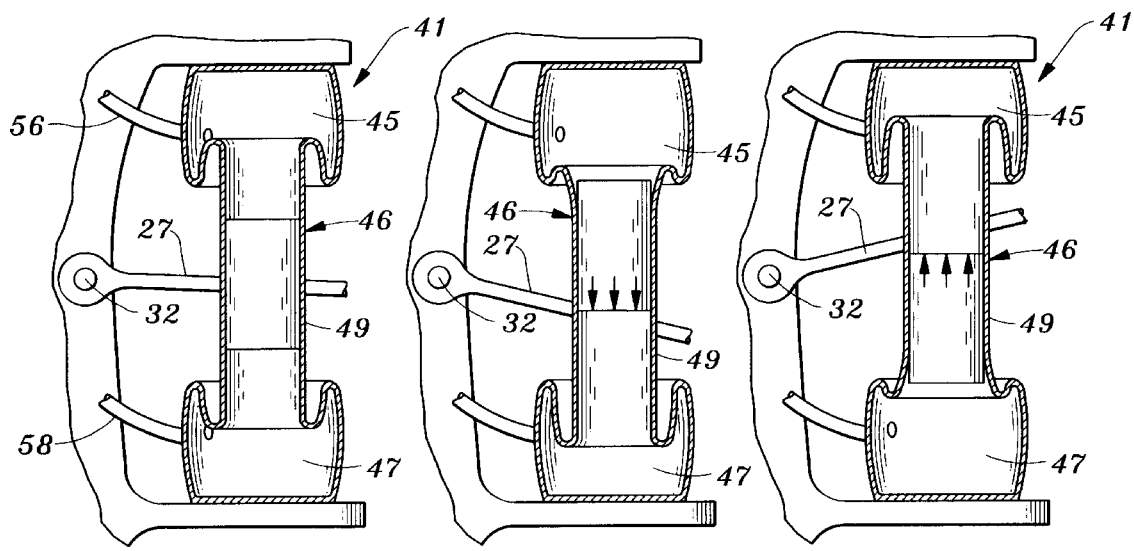
FIG. 8 depicts a forward left hand corner of a suspension system of the type shown in FIG. 1 constructed in accordance with the present invention, in which the system is adapted to the currently popular Double Wishbone suspension, modified to provide the active components of the present invention to interact with an element of the Double Wishbone configuration to accomplish the objectives of the invention.
FIG. 9 is a view of FIG. 8 illustrating the response of the suspension of the present invention to forces generated thereon during the right hand maneuver.
FIG. 10 is a view of FIG. 8 illustrating the response of the suspension of the present invention to forces generated thereon during the left hand maneuver.

Thus, and with reference to FIG. 8, the suspension system is illustrated as it would appear at such times as the vehicle is experiencing smooth straight line movement, with no impediments to driving, and the gas pressure in chambers 45 and 47 is relatively uniform.

In FIG. 10, however, the system has experienced, and is reacting to, an obstacle in the roadway that causes the wheel W to be forced upwardly. When such an impediment is encountered, there is an upward pressure exerted by the upper control arm 27, which in turn transmits that pressure to the gas in the chamber 45. The gas control system instantly senses the additional pressure in the upper chamber and compensates by causing the pressure in the lower chamber 47 to be relieved, while simultaneously increasing the pressure in the upper chamber. This counter action tends to force the upper control arm down, and the frame relatively upwardly, thereby compensating for the tendency of the frame and, thus, the vehicle to be bumped upwardly by the impediment in the roadway.

If the impediment is a pot hole, or other such indentation in the roadway, the system responds equally but, of course, in the opposite direction as seen if FIG. 9, with the result that those within the confines of the cockpit of the vehicle equipped with the present invention experience greatly reduced jarring, swaying or other such distractions as a consequence of such road impediments.

As previously stated, the system is equally responsive to kinetic forces on the vehicle which result from centrifugal, and its equal and opposite component, centripetal force, acting on a body in motion about a point, which is what a vehicle experiences in a curve, for example.

Centrifugal force is the force that acts on a body moving about an axis, or center of rotation, which tends to cause the body to move away from the axis. That force translates, in terms of its action on a vehicle making a right hand turn, for example, into a tenancy of the vehicle to squat down on the left, or outer side, of the vehicle relative to the turn, and rise or lift up on the inner or right side, of the vehicle. While the severity of the experience is a function of speed, mass of the vehicle, and radius of the turn, one need not be exceeding safe driving limits to experience sufficient roll about the longitudinal axis of the vehicle to generate the uncomfortable feeling of at least some loss of control of the vehicle.

The independent suspension system of the present invention both detects and compensates for the roll characteristics just described. This is accomplished by sensing increased pressure in the upper chamber 45 of FIG. 9, caused by the vehicle attempting to squat on the outer or left hand side of the vehicle. As a result, the system responds by relieving some pressure in the upper chamber, while increasing pressure in the lower chamber, forcing the upper control arm 27 upwardly, with a resultant leveling of the vehicle. The suspension system on the right side responds identically, to opposite forces, thus tending to cause the right side of the vehicle to lower. The overall result will be seen as a leveling of the entire vehicle as it traverses the curve.

It will be appreciated that with the vehicle in a more level configuration, the footprint of each tire will be more nearly maximized, as unusual camber changes are avoided, and, as a consequence, traction and control are enhanced. Similarly, for those interested in performance rather than comfort, it will be apparent that, equipped with the suspension system of the present invention, a curve may be traversed at higher speeds with less loss of control.

The underlying principals which govern the operation of the present invention are no less susceptible to adaptation to existing strut and shock absorber systems.

Figures 11, 12:
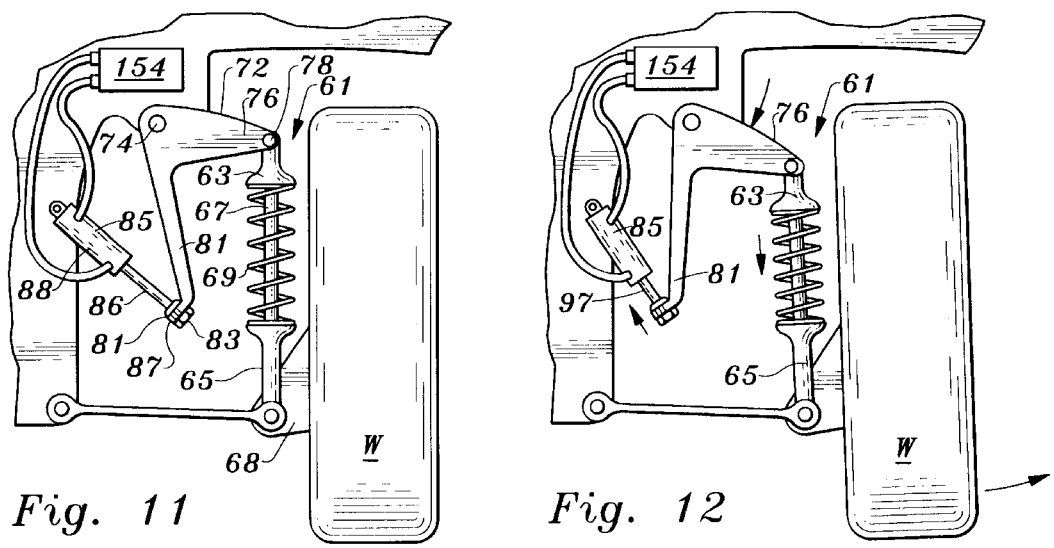
FIG. 11 represents yet another modified McPherson strut configuration equipped with interactive components so as to accomplish the goals of the present invention.
FIG. 12 is a view of FIG. 11 illustrating of the response of the suspension of the present invention to a right turn configuration.

For example, with reference to FIGS. 11 and 12, a more conventional strut system is illustrated as adapted to perform in accordance with the present invention. A strut assembly S includes a McPherson type vertically disposed strut 61 including an upper cap 63 and a base member 65, the cap and base being interconnected by a piston assembly, not illustrated in detail, but exemplified by a piston rod 67, which connects to a piston, not shown, reciprocally mounted within the cylindrical base 65. The piston moves against resistance offered by a fluid environment, in a well known manner.

In keeping with another aspect of the invention, the strut is secured to the spindle assembly by any suitable holding means such as strap 68. The function of the holding means is to establish a coplanar relationship between the strut 61 and the wheel W such that the operation of the strut will always be in a plane parallel to the wheel. In a typical case, for example, where the vehicle executes a right hand turn, the inside wheels will tend to exhibit a positive camber, while the outside wheels will tend to have a negative camber. Any such changes in the camber of a wheel during operation will cause a coincident change in the angle at which the strut functions relative to the road, but will not change the direction of movement of the strut relative to the wheel W.

A spring 69 provides a predetermined separation pressure, or load, on the piston assembly. The spring rate, or resistance of the spring to compress, determines the type of ride that the suspension will deliver, i.e., whether the ride will be hard or soft.

Due to potholes, ridges, and other road impediments common to most roadways, each wheel that comes in contact with such impediments will experience either an upward force, which will tend to compress the spring 69, or in the case of a depression or pothole, a negative force causing the wheel to drop, thereby relaxing the spring. While it is the intent of the strut assembly to smooth out these forces and, thus, the ride experienced by the vehicle, the ability of the strut to react quickly and with adequate counter measures, is such that additional measures are necessary if the kind of ride desired is to be achieved. It is this need to which the present invention is addressed.

As in the case of the gas system, in which the effective response, or as a corollary, spring rate, of the air bags is changed to minimize the response of the overall system to adverse forces, or more accurately, those forces encountered in the driving experience which tend to detract, rather than add to that experience, the same principal is employed in this embodiment, which treats the problem in an already well known suspension system.

In keeping with the invention, and in order to cause the strut 61 to adjust, or compensate, in response to exterior forces on the wheel, a crank mechanism 72 is pivotally mounted to the frame at 74. A forwardly extending arm 76, of the crank 72 is attached at 78 to the cap 63 of the strut 61. A depending arm 81 of the crank 72 is connected at 83 to a fluid motor 85. The fluid motor, which in the illustrated case is in the form of a hydraulic ram, is operated by a gas control system 154. The fluid motor, which is of familiar construction, has a rod 86, which is attached to the lower end of the arm 81, at 87. The cylindrical body 88 of the fluid motor 85 houses a piston which attaches within the cylinder to the rod 86 and is reciprocally there within in response to the application of fluid pressure delivered to one side or the other of the piston by the gas control system 154.

As previously described, the gas control system includes force responsive devices, of which there are several available, and which are sensitive to adverse forces on the vehicle, and which cause a reaction at the fluid motor to minimize the consequences of those forces during operation of the vehicle.

For example, if the wheel W experiences forces that would tend to cause it to drop, or centrifugal forces that would tend to make the vehicle frame lift up, the system instantly responds to lightening of the load on the strut, to increase that load sufficiently to compensate for the lightening. This is accomplished by energizing the fluid motor 85, causing the ram 97 to retract. In so doing, the crank 72 is rotated clockwise about the crank mount 74, resulting in a tendency toward compression of the spring 69, to counteract the effect of the outside forces on the wheel, and compensate for the load change on the suspension.

The normal roll characteristic of the vehicle is, thus, modulated to minimize adverse consequences of an intervening force, whatever it may be. The opposite action, of course, results from a force that would tend to load or compress the strut.

Figure 13:
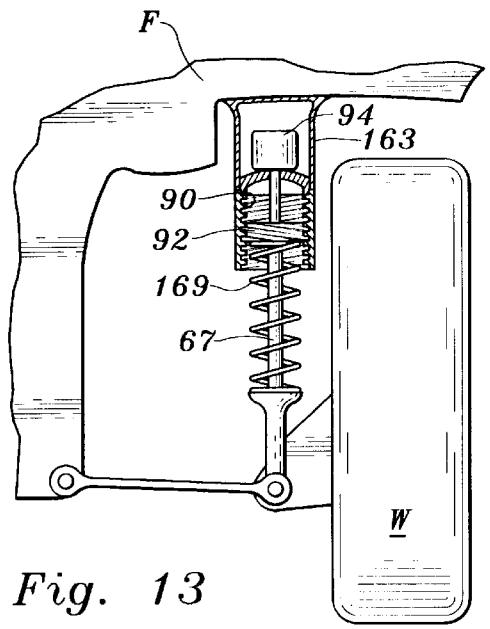
FIG. 13 illustrates a further modification of the interactive components of the suspension system of the present invention, operating in concert with a strut, or familiar shock absorber system in common uses on existing vehicles, to accomplish the objectives of the present invention.
Figure 14:
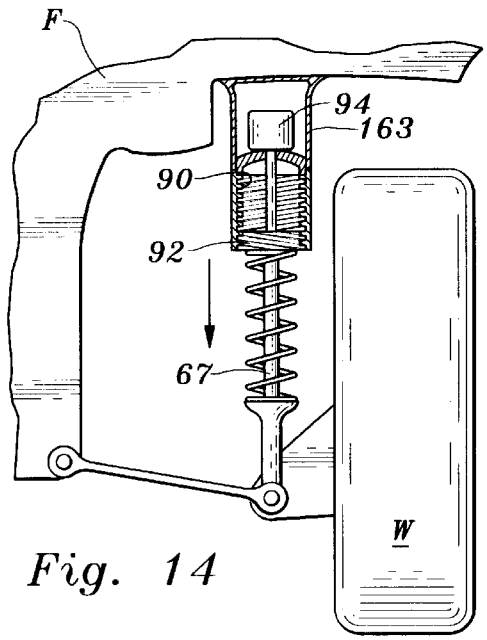
FIG. 14 is a view of FIG. 13 illustrating the response of the system of the present invention to forces experienced by a vehicle equipped with the present invention to a right hand maneuver.

Referring to FIGS. 13 and 14, a variation on the theme of FIGS. 11 and 12 is illustrated in its fundamental configuration. In situations where the vehicle is less likely to be placed in a situation where centrifugal forces become a concern, e.g., large family or executive vehicles, but irregularities in the driving surface are nonetheless encountered on a regular basis, the present invention invites a simplified option which smooths out the road and, thus, the comfort and control with which the vehicle is driven.

Thus, as seen in FIGS. 13 and 14, a cap 163, which has been modified in accordance with the teachings of the present invention, is integrated into a McPherson type strut and, in accordance with the present invention, is formed with an internal thread 90, which is fitted over, and engages a screw 92. The cap 163 is securely mounted to the frame F of the vehicle. The screw element 92 is coaxial with, and receives the piston rod 67 and is rotatable relative thereto.

A motor 94 is provided within the cap, although it may be externally disposed without departure from the invention, and the motor may be electrically operated, or fluid motivated by the gas control system previously described. The motor 94 is attached to the screw 92 by means of a shaft 95. The motor 94 drives the shaft to rotate the screw 92 in either a clockwise or counterclockwise direction, in consequence of which the spring 169 is either compressed, or the preset pressure is relieved to adjust the spring rate to compensate for external forces on the wheel assembly.

By integrating the motive system with the sensing system in the manner previously described, it will now be apparent to one skilled in the art that by rotating the screw element 92, the effective spring rate of the strut is quickly modified in response to shock loads on the wheel resulting from irregularities in the roadway, to thereby counteract vertical forces on the wheel, to thereby minimize transmittal of those potentially destructive forces to the driving compartment.

Figure 15:
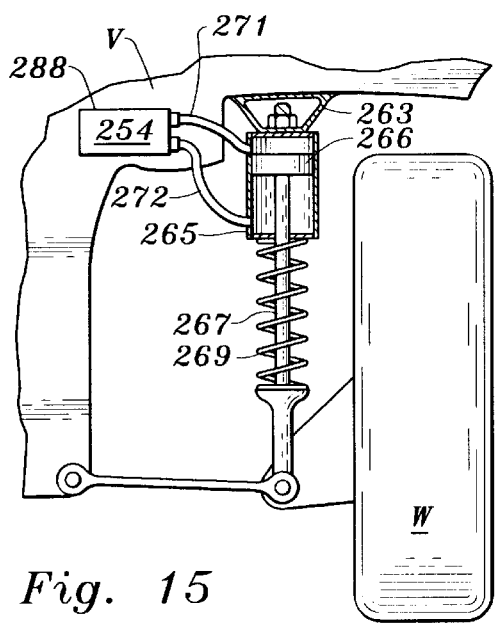
FIG. 15 again, illustrates the system in which features of a strut system and hydraulic sleeve cylinder are combined to accomplish the objectives of the invention; and, FIG. 16 is a view of FIG. 15 specifically employing the structure of a hydraulic sleeve cylinder in a modified strut assembly.
Figure 16:
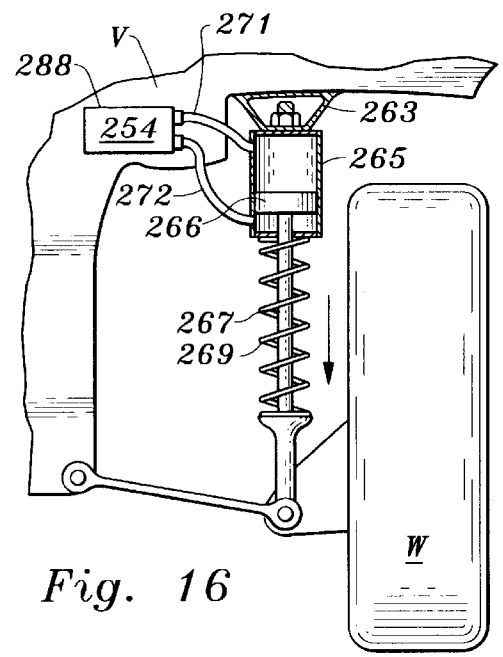

With reference now to FIGS. 15 and 16, yet another adaptation of the present invention is illustrated. More specifically, in the concept of the present invention, it lends itself to the use of hydraulic as well as to the mechanical compensation described with respect to FIGS. 11 through 14.

Thus, referring to FIG. 15, a cap 263 is affixed to the frame F of the vehicle, in any well known manner, and the cylindrical body 265 constitutes the cylinder of a fluid motor. A piston 266 is fitted to the rod 267 centrally disposed within the spring 269, and the position of the piston within the cylindrical body is adjustable by means of the fluid motor.

Thus, fluid lines 271 and 272 connect the fluid motor to the face, and the rear portion of the piston, in a well known manner, and by use of the sensing system previously described, fluid pressure is applied to the piston to position it within the cylinder. As a result, the spring rate of the spring 269 is adjusted in response to the external forces experienced by the suspension system at each wheel W.

It is within the contemplation of the present invention that the sensations experienced by the driver of a vehicle are, in reality, the primary factor in determining the acceptability of the ride delivered by that vehicle under a variety of circumstances. The dynamic forces acting on the driver, are, of course, similar to those acting on the vehicle itself, although the mass of the driver may be as much as 50 times that of the unsprung weight of the vehicle itself.

Logically, therefore, if the response of the driver to centrifugal and shock forces could be measured, the appropriate response of the suspension system in modulation of those adverse forces could be accomplished.

Figure 1:
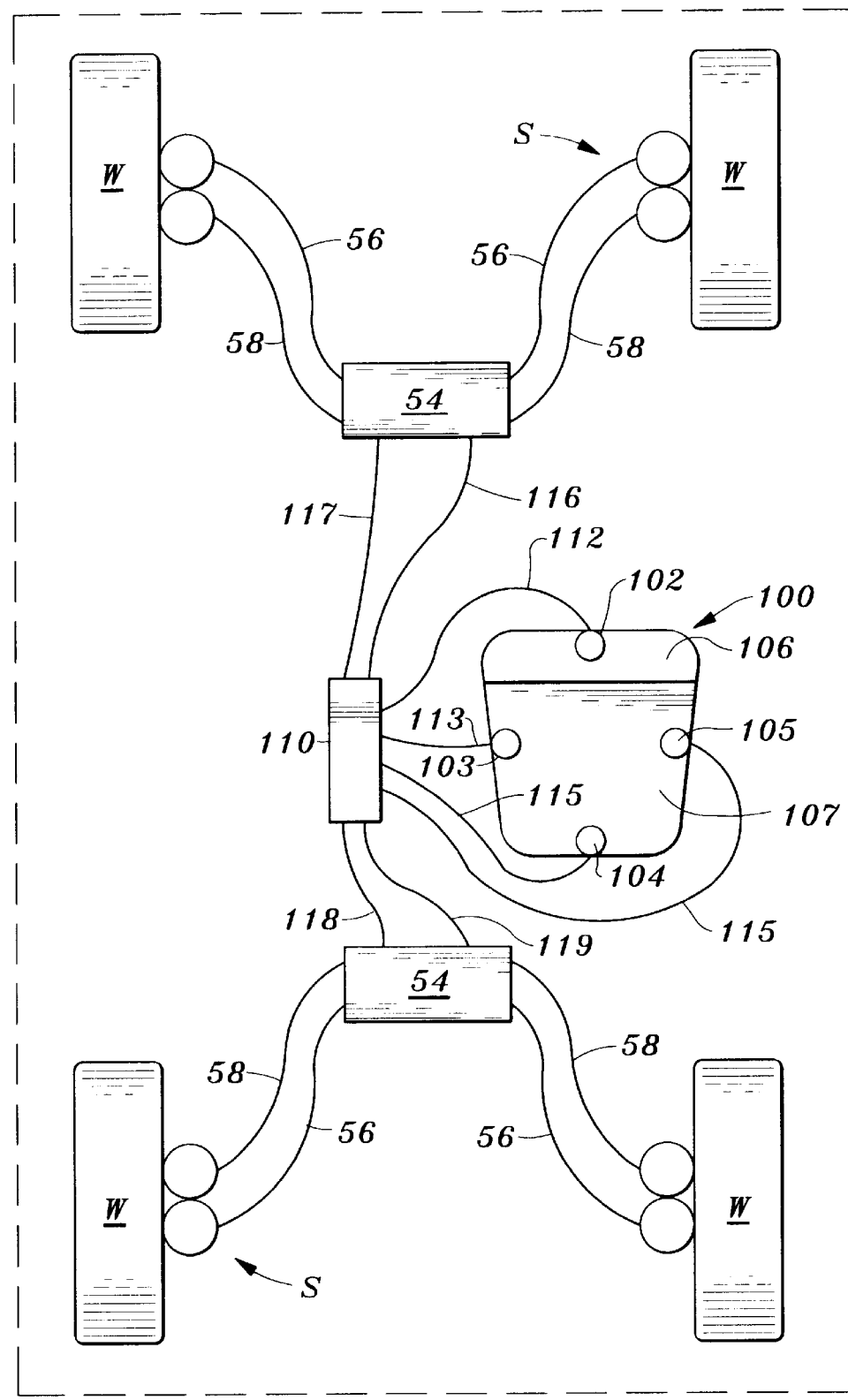
FIG. 1 is a schematic drawing of a control system constructed in accordance with the present invention, interfaced with the drivers seat in the vehicle so as to permit selective control of the suspension system of the present invention, either automatically or manually as the driver may desire.

To this end, and with reference to FIG. 1, an ergonomically designed drivers seat 100 is provided, having a seat element 103 and a back element 102. The seat may be of any one of several such seats available on the market, of which the Ricaro® is but one. The seat is fitted with a series of sensors 102, 103, 104, and 105, which sense pressure as the driver's body experiences dynamic forces causing it to move. Information generated at the sensors is transmitted instantly to an infomation processing center 110 by lines 112, 113, 114, and 115.

The information processing center analyzes the input from the sensors and generates a response, which it transmits to the suspension system, or system S, to bring about a compensatory response. This is accomplished by transmitting the appropriate message via lines 118, 119, 120, and 121 to, for example, control systems 54 or 154, depending on which system is in use on the expemlary vehicle. The control system transmits the necessary response to the suspension system in a manner previously described, and the effect is to modulate the response of the vehicle to enhance the comfort of driver and passenger alike.

By way of example, in a right hand turn, the driver's body will be urged toward the driver side door, which movement would be sensed particularly by the sensor 106. That response would be transmitted by the line 113 to the processing center 110, and thence to the left front suspension system S to cause the body of the vehicle to squat. Similarly, the right suspension system would be caused to stiffen and raise somewhat, the sum of those reactive inputs being to tend to level the vehicle against the centrifugal forces effecting it and the driver.

No particular effort has been made to attribute novelty to any particular sensing, or information processing, equipment because there are several such systems readily available, all of which are effective within the enviornment of the present invention, to a greater or lessor extent, and it is a stated objective of the present invention to provide a responsive system that is economical. Economy, of course, is dictated by the particular type of vehicle, and the present invention is, therefore, designed to be effective with a variety of available parts.

Having thus described the present invention in all necessary detail, what is claimed is:

1. In a motor vehicle for transporting at least a driver along a surface, having a frame, a body secured to the frame and encapsulating the driver situated in a seat mounted to the said frame and wheels supporting said frame relative to the surface on which the vehicle is situated, and wherein at least some of said wheels are suspended from the frame of the vehicle by means of a suspension system comprising:

a spindle assembly for supporting each said wheel relative to said frame;

at least one control arm, said control arm having opposed ends, one of said opposed ends being mounted to said frame for relative movement thereto of the vehicle, the opposed one of said ends being mounted to said spindle for movement relative thereto;

a driver's seat, said driver's seat mounted directly to said frame of the vehicle for supporting a driver therein;

at least one sensor, said sensor being mounted in said driver's seat so as to make contact with the driver's body seated therein; said sensor being responsive to movement of the driver's body in response to gravitational and inertial forces to generate a signal in response thereto;

a motive system being disposed between and connected to said frame and at least one said control arm;

said sensor being connected to said motive system to stimulate said motive system to cause movement of said control arm relative to the frame of the vehicle in response to a signal from said sensor, to compensate for the effects of the gravitational and inertial forces on the driver.

2. The improved suspension system of claim 1, wherein said motive system includes a fluid motor.

3. The improved suspension system of claim 2, wherein said fluid motor comprises an air bag.

4. The improved suspension system of claim 1, wherein upper and lower control arms are provided, said control arms being coplanar.

5. The improved suspension system of claim 4, wherein the movement of said upper and lower control arms relative to the frame and said spindle assembly are in substantially the same direction.

6. The improved suspension system of claim 2, wherein said motive system circumscribes said control arm so as to be able to apply motive forces to said control arm in at least two directions.

7. The improved suspension system of claim 6, wherein said fluid motor comprises an air bag, said air bag having upper and lower chambers, and said fluid motor further including valve means for selectively inflating and deflating each of said upper and lower chambers in response to said sensor.

8. The improved suspension of claim 6, wherein upper and lower control arms are provided, said control arms being coplanar.

* * * * *